United States Patent
Chae et al.

(10) Patent No.: US 11,539,039 B2
(45) Date of Patent: Dec. 27, 2022

(54) NEGATIVE ELECTRODE FOR LITHIUM SECONDARY BATTERY, LITHIUM SECONDARY BATTERY COMPRISING THE SAME, AND PREPARATION METHOD THEREOF

(71) Applicant: LG CHEM, LTD., Seoul (KR)

(72) Inventors: Oh Byong Chae, Daejeon (KR); Eun Kyung Kim, Daejeon (KR); Dong Sub Jung, Daejeon (KR); Sang Wook Woo, Daejeon (KR); Ju Ho Chung, Daejeon (KR); Hee Won Choi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 65 days.

(21) Appl. No.: 16/310,534

(22) PCT Filed: Jan. 23, 2018

(86) PCT No.: PCT/KR2018/001018
§ 371 (c)(1),
(2) Date: Dec. 17, 2018

(87) PCT Pub. No.: WO2018/135929
PCT Pub. Date: Jul. 26, 2018

(65) Prior Publication Data
US 2020/0052282 A1 Feb. 13, 2020

(30) Foreign Application Priority Data
Jan. 23, 2017 (KR) .................. 10-2017-0010343
Jan. 22, 2018 (KR) .................. 10-2018-0007714

(51) Int. Cl.
| | |
|---|---|
| *H01M 4/133* | (2010.01) |
| *H01M 4/04* | (2006.01) |
| *H01M 4/1393* | (2010.01) |
| *H01M 4/36* | (2006.01) |
| *H01M 10/0525* | (2010.01) |
| *H01M 4/02* | (2006.01) |

(52) U.S. Cl.
CPC ......... *H01M 4/133* (2013.01); *H01M 4/0421* (2013.01); *H01M 4/1393* (2013.01); *H01M 4/366* (2013.01); *H01M 10/0525* (2013.01); *H01M 2004/027* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 7,763,387 B2 | 7/2010 | Yamamoto et al. | |
| 8,034,475 B2 | 10/2011 | Yamamoto et al. | |
| 9,793,539 B2 | 10/2017 | Sheem et al. | |
| 2003/0036000 A1 | 2/2003 | Mori et al. | |
| 2003/0138698 A1 | 7/2003 | Lee et al. | |
| 2005/0084758 A1 | 4/2005 | Yamamoto et al. | |
| 2006/0134524 A1 | 6/2006 | Nakai et al. | |
| 2010/0249031 A1 | 9/2010 | Yamamoto et al. | |
| 2011/0177388 A1* | 7/2011 | Bae .............. | H01M 4/133 429/209 |
| 2013/0177811 A1 | 7/2013 | Roffat et al. | |
| 2013/0288130 A1* | 10/2013 | Sheem .......... | H01M 4/133 429/231.8 |
| 2014/0205905 A1 | 7/2014 | Xiao et al. | |
| 2015/0180023 A1 | 6/2015 | Xiao et al. | |

FOREIGN PATENT DOCUMENTS

| | | |
|---|---|---|
| CN | 1400680 A | 3/2003 |
| CN | 1794511 A | 6/2006 |
| CN | 103378349 A | 10/2013 |
| CN | 103943819 A | 7/2014 |
| CN | 207441857 U | 6/2018 |
| EP | 2660902 A1 | 11/2013 |
| JP | 2000-12026 A | 1/2000 |
| JP | 2002352801 A * | 12/2002 |
| JP | 2007-103119 A | 4/2007 |
| JP | 4466363 B2 | 5/2010 |
| KR | 10-2003-0062541 A | 7/2003 |
| KR | 10-2008-0076527 A | 8/2008 |
| KR | 10-2012-0068790 A | 6/2012 |
| KR | 10-2012-0073603 A | 7/2012 |
| KR | 10-2013-0122469 A | 11/2013 |
| KR | 10-2013-0143035 A | 12/2013 |
| WO | WO 2008/100002 A1 | 8/2008 |

OTHER PUBLICATIONS

International Search Report (PCT/ISA/210) issued in PCT/KR2018/001018, dated May 9, 2018.
Extended European Search Report dated May 29, 2019, for corresponding European Patent Application No. 18741399.2.

* cited by examiner

*Primary Examiner* — Victoria H Lynch
(74) *Attorney, Agent, or Firm* — Birch, Stewart, Kolasch & Birch, LLP

(57) ABSTRACT

A negative electrode for a lithium secondary battery, in which a LiF layer comprising amorphous LiF in an amount of 30 mol % or more is formed on a negative electrode active material layer comprising a carbon-based active material, a lithium secondary battery comprising the same, and a preparation method thereof.

11 Claims, No Drawings

NEGATIVE ELECTRODE FOR LITHIUM SECONDARY BATTERY, LITHIUM SECONDARY BATTERY COMPRISING THE SAME, AND PREPARATION METHOD THEREOF

CROSS-REFERENCE TO RELATED APPLICATIONS

The present application claims the benefit of priority based on Korean Patent Application No. 10-2017-0010343, filed on Jan. 23, 2017, and Korean Patent Application No. 10-2018-0007714, filed on Jan. 22, 2018, the entire contents of which are incorporated herein by reference.

TECHNICAL FIELD

The present invention relates to a negative electrode for a lithium secondary battery, a lithium secondary battery comprising the same, and a preparation method thereof, and more particularly, to a negative electrode for a lithium secondary battery in which a LiF layer comprising amorphous LiF is formed on a negative electrode active material layer, a lithium secondary battery comprising the same, and a preparation method thereof.

BACKGROUND ART

Demand for secondary batteries as an energy source has been significantly increased as technology development and demand with respect to mobile devices have increased, and, among these secondary batteries, lithium secondary batteries having high energy density, high operating potential, long cycle life, and low self-discharging rate have been commercialized and widely used.

Lithium metal has been used as a negative electrode of a typical lithium secondary battery. However, since it has been known that a battery short circuit may occur due to the formation of dendrites and there is a risk of explosion due to the short circuit, the lithium metal is being replaced by a carbon-based compound capable of reversibly intercalating and deintercalating lithium ions as well as maintaining structural and electrical properties.

Since the carbon-based compound has a very low discharge voltage of about −3 V with respect to a hydrogen standard electrode potential and exhibits highly reversible charge and discharge behavior due to the uniaxial orientation of a graphene layer, the carbon-based compound exhibits excellent electrode cycle life. Also, since the carbon-based compound may exhibit a potential that is almost similar to pure lithium metal, i.e., the electrode potential of the carbon-based compound is 0 V Li/Li$^+$ during lithium (Li)-ion charge, higher energy may be obtained when a battery is formed with an oxide-based positive electrode.

Charge and discharge of the lithium secondary battery is performed while a process of intercalating and deintercalating lithium ions from a lithium metal oxide positive electrode into and out of a graphite negative electrode is repeated. In this case, since lithium is highly reactive, the lithium reacts with the carbon-based compound to form $Li_2CO_3$, LiO, or LiOH, and thus, a film may be formed on the surface of the negative electrode comprising the carbon-based compound as an active material. The film is denoted as "solid electrolyte interface (SEI)", wherein the SEI formed at an initial stage of charging may prevent a reaction of the lithium ions with the carbon negative electrode or other materials during charge and discharge, and may act as an ion tunnel that only passes the lithium ions. The ion tunnel may prevent the collapse of a structure of the carbon negative electrode due to the co-intercalation of the carbon negative electrode and organic solvents of the electrolyte solution having a high molecular weight which solvates the lithium ions and moves therewith.

However, in a case in which a thick SEI is formed on the surface of the negative electrode, rapid charging capability of the negative electrode may be reduced, and thus, there is a need to form the SEI to an appropriate thickness.

The carbon-based compound, as a negative electrode active material of the lithium secondary battery, is advantageous in that it exhibits excellent cycle performance, but it is disadvantageous in that safety at overcharge and high temperature is somewhat lacking. In order to improve the safety at overcharge and high temperature, there is a need to appropriately suppress a calorific value when the lithium secondary battery is exposed to an overcharge and high-temperature state.

Thus, there is a need to develop a new negative electrode for a lithium secondary battery in which the above-described disadvantages and requirements when the carbon-based compound is used as a negative electrode active material of the lithium secondary battery are improved.

DISCLOSURE OF THE INVENTION

Technical Problem

An aspect of the present invention provides a negative electrode for a lithium secondary battery in which a solid electrolyte interface (SEI) may be formed to an appropriate thickness on the surface thereof.

Another aspect of the present invention provides a lithium secondary battery comprising the negative electrode for a lithium secondary battery.

Another aspect of the present invention provides a preparation method of the negative electrode for a lithium secondary battery.

Technical Solution

According to an aspect of the present invention, there is provided a negative electrode for a lithium secondary battery comprising: a negative electrode active material layer comprising a carbon-based active material; and a LiF layer which is formed on the negative electrode active material layer and comprises amorphous LiF in an amount of 30 mol % or more.

According to another aspect of the present invention, there is provided a preparation method of the negative electrode for a lithium secondary battery which comprises the steps of: (1) forming a negative electrode active material layer comprising a carbon-based active material on a negative electrode collector; and (2) depositing a LiF layer on the negative electrode active material layer.

According to another aspect of the present invention, there is provided a lithium secondary battery comprising the negative electrode for a lithium secondary battery.

Advantageous Effects

Since a solid electrolyte interface (SEI) may be formed to an appropriate thickness on the surface of a negative electrode for a lithium secondary battery according to the present invention, the negative electrode for a lithium secondary battery exhibits excellent rapid charging capability, a low calorific value when exposed to an overcharge and high-temperature state, and good short-circuit safety.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

A negative electrode for a lithium secondary battery according to the present invention comprises a negative electrode active material layer comprising a carbon-based active material; and a LiF layer which is formed on the negative electrode active material layer and comprises amorphous LiF in an amount of 30 mol % or more.

The LiF layer is a layer comprising lithium fluoride (LiF), wherein LiF may be formed in the form of a thin layer on the negative electrode active material layer comprising a carbon-based active material.

Since the LiF layer may be formed on the negative electrode active material layer comprising a carbon-based active material to suppress an excessive increase in thickness of a solid electrolyte interface (SEI) formed on a surface of the negative electrode during charge and discharge of a lithium secondary battery comprising the negative electrode, the LiF layer may improve rapid charging characteristics of the negative electrode. Also, since the LiF layer may reduce a calorific value when the lithium secondary battery comprising the negative electrode is exposed to an overcharge and high-temperature state by acting as a protective layer of the negative electrode active material layer and may also act as an insulator when a positive electrode and the negative electrode are short-circuited, the LiF layer may improve safety of the lithium secondary battery.

The LiF layer may comprise an additional component in addition to LiF, for example, a lithium fluoride-based compound and/or a lithium oxide-based compound, and, specifically, the LiF layer may further comprise at least one selected from the group consisting of $Li_2O$, $Li_2CO_3$, and LiOH, in addition to LiF.

The LiF layer may comprise the at least one selected from the group consisting of $Li_2O$, $Li_2CO_3$, and LiOH in an amount of 3 wt % to 90 wt %, particularly 5 wt % to 50 wt %, and more particularly 7 wt % to 30 wt %. In a case in which the LiF layer comprises the at least one selected from the group consisting of $Li_2O$, $Li_2CO_3$, and LiOH within the above range, a fraction of the amorphous LiF included in the LiF layer may be increased, the rapid charging characteristics may be improved, and an effect of reducing the calorific value during overcharge and high-temperature exposure may be further improved.

In the negative electrode for a lithium secondary battery according to an example of the present invention, the carbon-based active material may comprise at least one selected from the group consisting of soft carbon, hard carbon, natural graphite, artificial graphite, Kish graphite, pyrolytic carbon, mesophase pitch based carbon fibers, meso-carbon microbeads, mesophase pitches, petroleum derived cokes, and coal tar pitch derived cokes, may particularly comprise graphite such as natural graphite, artificial graphite, and Kish graphite, and may more particularly comprise natural graphite.

That is, since the negative electrode for a lithium secondary battery according to the specific example of the present invention comprises natural graphite, as a negative electrode active material, and a layer of amorphous LiF formed on the negative electrode active material layer comprising the natural graphite, the negative electrode for a lithium secondary battery may exhibit high safety, in which safety at overcharge and high temperature is improved, while exhibiting excellent cycle performance as an advantage of the natural graphite.

The LiF layer comprises the amorphous LiF in an amount of 30 mol % or more, and, since the amorphous LiF has higher ionic conductivity than crystalline LiF, the amorphous LiF may have a better effect on diffusion of lithium (Li) ions.

Instead of directly forming the LiF layer on the negative electrode active material layer comprising the carbon-based active material, when a metal oxide layer is formed on the surface of the negative electrode active material layer comprising the carbon-based active material and a LiF layer is formed on the metal oxide layer, amorphous LiF may be more easily included in the LiF layer. Thus, the negative electrode for a lithium secondary battery according to the example of the present invention may further comprise the metal oxide layer formed between the negative electrode active material layer and the LiF layer.

The amorphous LiF may be included in an amount of 30 mol % or more, particularly 60 mol % or more, and more particularly 60 mol % to 99 mol %, for example, 70 mol % to 95 mol % based on a total number of moles of LiF included in the LiF layer. In a case in which the amorphous LiF is included within the above amount range based on the total number of moles of LiF included in the LiF layer, a low calorific value may be obtained when exposed to the overcharge and high-temperature state and good short-circuit safety may be achieved while exhibiting better rapid charging characteristics. That is, in a case in which the amorphous LiF is included within the above amount range, an excellent effect that may be achieved by comprising the amorphous LiF may be more appropriately achieved.

The metal oxide layer may comprise at least one selected from the group consisting of titanium oxide, aluminum oxide, chromium trioxide, zinc oxide, copper oxide, magnesium oxide, zirconium dioxide, molybdenum trioxide, vanadium pentoxide, niobium pentoxide, iron oxide, manganese oxide, vanadium oxide, cobalt oxide, nickel oxide, and tantalum pentoxide, and may specifically comprise at least one selected from the group consisting of aluminum oxide, chromium trioxide, zirconium dioxide, and tantalum pentoxide.

Also, the negative electrode for a lithium secondary battery according to the example of the present invention may further comprise a lithium compound layer formed on the LiF layer, and the lithium compound layer may comprise at least one selected from the group consisting of $Li_2O$, $Li_2CO_3$, and LiOH. In a case in which the lithium compound layer is further formed on the LiF layer, since the lithium compound layer acts as an additional active material protective layer, the calorific value when exposed to the overcharge and high-temperature state may be further lowered and additional short-circuit safety may be provided.

In the negative electrode for a lithium secondary battery according to the example of the present invention, the negative electrode active material layer may have a thickness of 10 μm to 100 μm, for example, 50 μm to 80 μm.

In the negative electrode for a lithium secondary battery according to the example of the present invention, the LiF layer may have a thickness of 10 nm to 1,000 nm, particularly 50 nm to 200 nm, and more particularly 50 nm to 100 nm.

In a case in which the LiF layer has a thickness within the above range, it may allow the LiF layer itself not to be an electrical resistance layer while the LiF layer may more appropriately exhibit an effect of adjusting the thickness of the SEI formed during charge and discharge of the lithium secondary battery and may more appropriately function as a protective layer of the negative electrode active material layer.

In the negative electrode for a lithium secondary battery according to the example of the present invention, the metal oxide layer may have a thickness of 1 nm to 50 nm, for example, 2 nm to 5 nm.

In a case in which the metal oxide layer has a thickness within the above range, since the amorphous LiF may be more easily formed during the formation of the LiF layer, it may allow the metal oxide layer itself not to be an electrical resistance layer while the LiF layer is allowed to more appropriately comprise the amorphous LiF.

Furthermore, the present invention provides a preparation method of the negative electrode for a lithium secondary battery.

The preparation method of the negative electrode for a lithium secondary battery of the present invention comprises the steps of: (1) forming a negative electrode active material layer comprising a carbon-based active material on a negative electrode collector; and (2) depositing a LiF layer on the negative electrode active material layer.

In step (1), a negative electrode active material layer comprising a carbon-based active material is formed on a negative electrode collector as in a conventional method. For example, the negative electrode may be prepared according to the method of forming the negative electrode active material layer on the negative electrode collector in which, after a slurry is prepared by mixing and stirring the carbon-based active material with a solvent as well as a binder and a conductive agent, if necessary, the negative electrode collector is coated with the slurry, compressed, and then dried.

In step (2), a LiF layer is deposited on the negative electrode active material layer formed in step (1).

The deposition may be performed by sputtering, E-Beam, physical vapor deposition (PVD) comprising evaporation or thermal evaporation, or chemical vapor deposition (CVD).

Since the LiF layer is formed by the deposition, the LiF layer may be adjusted to have a more appropriate thickness.

The deposition may be performed in a temperature range of 700° C. to 900° C., for example, 750° C. to 850° C., and may be performed for 5 minutes to 12 hours, particularly 5 minutes to 6 hours, and more particularly 10 minutes to 4 hours. When the deposition temperature is less than the above range, the deposition may not be smoothly performed, and, when the deposition temperature is greater than the above range, since the amount of the amorphous LiF included in the LiF layer may be reduced, it is necessary to appropriately adjust the deposition temperature within the above range. Also, since the thickness of the LiF layer formed is adjusted by the deposition time, it is necessary to appropriately adjust the deposition time within the above range according to the thickness of the LiF layer to be formed.

Between steps (1) and (2), step (3) of forming a metal oxide layer on the negative electrode active material layer may be further included.

In a case in which step (3) of forming a metal oxide layer is performed, the LiF layer may be formed on the metal oxide layer.

In a case in which the LiF layer is formed on the metal oxide layer in comparison to a case where the LiF layer is deposited on the negative electrode active material layer, the LiF layer is allowed to more easily comprise the amorphous LiF. Thus, since the metal oxide layer is preferentially formed on the negative electrode active material layer in step (3), the LiF layer is allowed to more effectively comprise the amorphous LiF.

The forming of the metal oxide layer may be performed by drop coating, chemical vapor deposition, melting coating, electrodynamic coating, electrospraying, electrospinning, or dip coating.

The negative electrode active material layer may have a porosity of 10% to 60%, particularly 20% to 40%, and more particularly 25% to 35%.

The negative electrode collector is generally formed to a thickness of 3 μm to 500 μm. The negative electrode collector is not particularly limited as long as it has conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, similar to a positive electrode collector, microscopic irregularities may be formed on the surface of the collector to improve the adhesion of the negative electrode active material, and the negative electrode collector may be used in various shapes such as a film, a sheet, a foil, a net, a porous body, a foam body, a non-woven fabric body, and the like.

Any binder and conductive gent typically used in the art may be used as the binder and the conductive agent used in the negative electrode.

An organic solvent, such as N-methylpyrrolidone (NMP), dimethylformamide (DMF), acetone, and dimethylacetamide, or water may be used as the solvent used for forming the negative electrode. These solvents may be used alone or in a mixture of two or more thereof. An amount of the solvent used may be sufficient if the solvent may dissolve and disperse the negative electrode active material, the binder, and the conductive agent in consideration of a coating thickness of the slurry and manufacturing yield.

Various types of binder polymers, such as a polyvinylidene fluoride-hexafluoropropylene copolymer (PVDF-co-HFP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polyacrylate, an ethylene-propylene-diene monomer (EPDM), a sulfonated EPDM, a styrene-butadiene rubber (SBR), a fluorine rubber, poly acrylic acid, and a polymer having hydrogen thereof substituted with Li, sodium (Na), or calcium (Ca), or various copolymers, may be used as the binder.

Any conductive agent may be used without particular limitation so long as it has conductivity without causing adverse chemical changes in the battery, and, for example, a conductive material such as: graphite such as natural graphite or artificial graphite; a carbon black such as acetylene black, Ketjen black, channel black, furnace black, lamp black, and thermal black; conductive fibers such as carbon fibers and metal fibers; conductive tubes such as carbon nanotubes; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives may be used.

According to an embodiment of the present invention, the negative electrode may further comprise a thickener for viscosity control. The thickener may be a cellulose-based compound, and, for example, the thickener may comprise at least one selected from the group consisting of carboxymethyl cellulose (CMC), hydroxy methyl cellulose, hydroxy ethyl cellulose, and hydroxy propyl cellulose, and may particularly comprise CMC. The negative electrode active material and binder as well as the thickener may be dispersed in water to be used in the negative electrode.

The present invention provides a lithium secondary battery comprising the negative electrode for a lithium secondary battery.

The lithium secondary battery may comprise the negative electrode, a positive electrode, and a separator disposed between the positive electrode and the negative electrode.

The positive electrode may be prepared by a typical method known in the art. For example, a binder, a conductive agent, and a dispersant, if necessary, as well as a solvent are mixed with a positive electrode active material and stirred to prepare a slurry, a metal current collector is then coated with the slurry and pressed, and the positive electrode may then be prepared by drying the coated metal current collector.

The metal current collector is a metal with high conductivity, wherein the metal current collector is not particularly limited so long as it, as a metal to which the slurry of the positive electrode active material may be easily adhered, has high conductivity without causing adverse chemical changes in the battery in a voltage range of the battery, and, for example, stainless steel, aluminum, nickel, titanium, fired carbon, or aluminum or stainless steel that is surface-treated with one of carbon, nickel, titanium, silver, or the like may be used. Also, the metal current collector may have a microscopic uneven surface to improve the adhesion of the positive electrode active material. The current collector may be used in various shapes, such as a film, a sheet, a foil, a net, a porous body, a foam body, a non-woven fabric body, and the like, and may have a thickness of 3 µm to 500 µm.

In the preparation method of a lithium secondary battery of the present invention, examples of the positive electrode active material may be lithium cobalt oxide ($LiCoO_2$); lithium nickel oxide ($LiNiO_2$); $Li[Ni_aCo_bMn_cM^1_d]O_2$ (where $M^1$ is at least one element selected from the group consisting of aluminum (Al), gallium (Ga), and indium (In), $0.3 \le a < 0.1$, $0 \le b \le 0.5$, $0 \le c \le 0.5$, $0 \le d \le 0.1$, and $a+b+c+d=1$); a layered compound, such as $Li(Li_eM^2_{f-e-f}M^3_f)O_{2-g}A_g$ (where $0 \le e \le 0.2$, $0.6 \le f \le 1$, $0 \le f' \le 0.2$, $0 \le g \le 0.2$, $M^2$ comprises manganese (Mn) and at least one selected from the group consisting of nickel (Ni), cobalt (Co), iron (Fe), chromium (Cr), vanadium (V), copper (Cu), zinc (Zn), and titanium (Ti), $M^3$ is at least one selected from the group consisting of Al, magnesium (Mg), and boron (B), and A is at least one selected from the group consisting of phosphorous (P), fluorine (F), sulfur (S), and nitrogen (N)), or a compound substituted with at least one transition metal; lithium manganese oxides such as $Li_{1+h}Mn_{2-h}O_4$ (where $0 \le h \le 0.33$), $LiMnO_3$, $LiMn_2O_3$, and $LiMnO_2$; lithium copper oxide ($Li_2CuO_2$); vanadium oxides such as $LiV_3O_8$, $V_2O_5$, and $Cu_2V_2O_7$; Ni-site type lithium nickel oxide represented by the chemical formula $LiNi_{1-i}M^4_iO_2$ (where $M^4$=Co, Mn, Al, Cu, Fe, Mg, B, or Ga, and $0.01 \le i \le 0.3$); lithium manganese composite oxide represented by the chemical formula $LiMn_{2-j}M^5_jO_2$ (where $M^5$=Co, Ni, Fe, Cr, Zn, or Ta, and $0.01 \le j \le 0.1$) or $Li_2Mn_3M^6O_8$ (where $M^6$=Fe, Co, Ni, Cu, or Zn); $LiMn_2O_4$ having a part of Li being substituted with alkaline earth metal ions; a disulfide compound; $LiFe_3O_4$, or $Fe_2(MoO_4)_3$, but the positive electrode active material is not limited thereto.

An organic solvent, such as N-methylpyrrolidone (NMP), dimethylformamide (DMF), acetone, and dimethylacetamide, or water may be used as the solvent used for forming the positive electrode. These solvents may be used alone or in a mixture of two or more thereof. An amount of the solvent used may be sufficient if the solvent may dissolve and disperse the positive electrode active material, the binder, and the conductive agent in consideration of a coating thickness of the slurry and manufacturing yield.

Various types of binder polymers, such as a polyvinylidene fluoride-hexafluoropropylene copolymer (PVDF-co-HFP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), a fluorine rubber, poly acrylic acid, and a polymer having hydrogen thereof substituted with Li, Na, or Ca, or various copolymers, may be used as the binder.

Any conductive agent may be used without particular limitation so long as it has conductivity without causing adverse chemical changes in the battery, and, for example, a conductive material such as: graphite such as natural graphite or artificial graphite; a carbon black such as acetylene black, Ketjen black, channel black, furnace black, lamp black, and thermal black; conductive fibers such as carbon fibers and metal fibers; conductive tubes such as carbon nanotubes; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives may be used.

An aqueous dispersant or an organic dispersant, such as N-methyl-2-pyrrolidone, may be used as the dispersant.

A typical porous polymer film used as a typical separator, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator. Also, a typical porous nonwoven fabric, for example, a nonwoven fabric formed of high melting point glass fibers or polyethylene terephthalate fibers may be used, but the separator is not limited thereto.

A lithium salt, which may be included as an electrolyte used in the present invention, may be used without limitation so long as it is typically used in an electrolyte for a lithium secondary battery. For example, any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ may be used as an anion of the lithium salt.

The electrolyte used in the present invention may comprise an organic liquid electrolyte, an inorganic liquid electrolyte, a solid polymer electrolyte, a gel-type polymer electrolyte, a solid inorganic electrolyte, and a molten inorganic electrolyte, which may be used in the preparation of a lithium secondary battery, but the present invention is not limited thereto.

A shape of the lithium secondary battery of the present invention is not particularly limited, but a cylindrical type using a can, a prismatic type, a pouch type, or a coin type may be used.

The lithium secondary battery according to the present invention may not only be used in a battery cell that is used as a power source of a small device, but may also be used as a unit cell in a medium and large sized battery module comprising a plurality of battery cells.

EXAMPLES

Hereinafter, the present invention will be described in detail, according to examples and experimental examples, but the present invention is not limited to these examples and experimental examples. The invention may be embodied in many different forms and should not be construed as being limited to the embodiments set forth herein. Rather, these example embodiments are provided so that this description will be thorough and complete, and will fully convey the scope of the present invention to those skilled in the art.

Example 1

A negative electrode active material slurry was prepared by adding 96 wt % of natural graphite, as a negative electrode active material, 1 wt % of Denka black (conductive agent), 2 wt % of SBR (binder), and 1 wt % of CMC (thickener) to water. After one surface of a copper current collector was coated with the prepared negative electrode active material slurry to a thickness of 65 μm, dried, and rolled, the coated copper current collector was punched into a predetermined size to prepare a negative electrode. LiF was deposited on the active material layer of the above-prepared negative electrode by physical vapor deposition (PVD). For the deposition, LiF powder was put in a thermal evaporator (Sunic System Co., Ltd.) and evaporated at 800° C. for 1 hour by thermal evaporation, and a final negative electrode was prepared by depositing a LiF layer to a thickness of 100 nm on a graphite electrode.

Example 2

A negative electrode was prepared in the same manner as in Example 1 except that the deposition was performed at 800° C. for 6 minutes to form a LiF layer having a thickness of 10 nm.

Example 3

A negative electrode active material slurry was prepared by adding 96 wt % of natural graphite, as a negative electrode active material, 1 wt % of Denka black (conductive agent), 2 wt % of SBR (binder), and 1 wt % of CMC (thickener) to water. After one surface of a copper current collector was coated with the prepared negative electrode active material slurry to a thickness of 65 μm, dried, and rolled, the coated copper current collector was punched into a predetermined size to prepare a negative electrode.

An $Al_2O_3$ layer was formed to a thickness of 2 nm on the active material layer of the above-prepared negative electrode by applying a power of 100 W for 10 seconds using a sputter.

LiF was deposited on the $Al_2O_3$ layer by physical vapor deposition (PVD). For the deposition, LiF powder was put in a thermal evaporator (Sunic System Co., Ltd.) and a final negative electrode was prepared by depositing a LiF layer to a thickness of 100 nm on a graphite electrode through thermal evaporation.

Example 4

A negative electrode was prepared in the same manner as in Example 3 except that an $Al_2O_3$ layer was formed to a thickness of 5 nm by applying a power of 100 W for 30 seconds.

Example 5

A negative electrode was prepared in the same manner as in Example 3 except that a LiF layer was deposited to a thickness of 10 nm.

Example 6

A negative electrode active material slurry was prepared by adding 96 wt % of natural graphite, as a negative electrode active material, 1 wt % of Denka black (conductive agent), 2 wt % of SBR (binder), and 1 wt % of CMC (thickener) to water. After one surface of a copper current collector was coated with the prepared negative electrode active material slurry to a thickness of 65 μm, dried, and rolled, the coated copper current collector was punched into a predetermined size to prepare a negative electrode.

Both LiF and $Li_2CO_3$ were deposited on the active material layer of the above-prepared negative electrode by physical vapor deposition (PVD). For the deposition, LiF powder and $Li_2CO_3$ powder, as raw materials, were put in a thermal evaporator (Sunic System Co., Ltd.) and evaporated at 800° C. for 1 hour and 10 minutes by thermal evaporation, and a final negative electrode was prepared by depositing a mixed layer of LiF and $Li_2CO_3$ to a thickness of 110 nm on a graphite electrode.

Example 7

A final negative electrode was prepared by further forming a 10 nm thick $Li_2CO_3$ layer by depositing $Li_2CO_3$ on the LiF layer of the negative electrode, on which the LiF layer having a thickness of 100 nm and prepared in Example 1 was deposited, for 6 minutes by physical vapor deposition (PVD).

Comparative Example 1

A negative electrode active material slurry was prepared by adding 96 wt % of natural graphite, as a negative electrode active material, 1 wt % of Denka black (conductive agent), 2 wt % of SBR (binder), and 1 wt % of CMC (thickener) to water. After one surface of a copper current collector was coated with the prepared negative electrode active material slurry to a thickness of 65 μm, dried, and rolled, the coated copper current collector was punched into a predetermined size to prepare a negative electrode.

Comparative Example 2

A negative electrode was prepared in the same manner as in Example 2 except that a highly crystalline LiF layer having a thickness of 10 nm was formed by changing the deposition temperature of Example 2 to 1,000° C.

Examples 1-1 to 7-1 and Comparative Examples 1-1 and 2-1: Preparation of Lithium Secondary Battery A Li metal foil (150 μm) was used as a counter electrode, a polyolefin separator was disposed between each of the negative electrodes prepared in Examples 1 to 7 and Comparative Examples 1 and 2 and the Li metal, and a coin-type half cell was then prepared by injecting an electrolyte in which 1 M $LiPF_6$ was dissolved in a solvent that was prepared by mixing ethylene carbonate (EC) and diethyl carbonate (DEC) in a volume ratio of 50:50.

Experimental Example 1—Measurement of Amount of Amorphous LiF

An amount of amorphous LiF included in the LiF layer of the negative electrodes respectively prepared in Examples to 7 and Comparative Example 2 was measured by a transmission electron microscope (TEM), and the results thereof are presented in Table 1 below.

Experimental Example 2—Rapid Charging Test

Rapid charging tests were performed on the batteries respectively prepared in Examples 1-1 to 7-1 and Comparative Examples 1-1 and 2-1 using an electrochemical charger/discharger. Before the rapid charging tests, an activation process was performed, and, specifically, the activation process was performed by performing 3 cycles of charging and discharging of each battery at a current density of 0.1 C-rate in a voltage range of 1.5 V to 0.005 V.

The rapid charging tests were performed on the batteries completing the activation process, and, specifically, rapid charging was performed at a current density of 2.9 C-rate for 12 minutes, and a state of charge (SOC) before the occurrence of lithium precipitation was measured based on a voltage graph thus obtained. SOCs when the lithium precipitation occurred are presented in Table 1 below.

Experimental Example 3—Calorimetry Experiment

An activation process was performed on the batteries respectively prepared in Examples 1-1 to 7-1 and Comparative Examples 1-1 and 2-1 by performing 3 cycles of charging and discharging of each battery at a current density of 0.1 C-rate in a voltage range of 1.5 V to 0.005 V.

After powder was obtained by scraping off the negative electrode layer in the battery charged to 0.005 V, 0.1 mL of an electrolyte solution (1 M $LiPF_6$ was dissolved in a solvent in which ethylene carbonate (EC) and diethyl carbonate (DEC) were mixed in a volume ratio of 50:50) was added to 13 mg of the powder, and the mixture thus obtained was then loaded into a differential scanning Calorimeter (DSC, Mettler Toledo) and heated at a rate of 10° C./min to measure a heat flow. The results thereof are presented in Table 1.

TABLE 1

| | Faction of amorphous LiF (mol %) | Lithium precipitation SOC (%) | Onset (° C.) | Main peak (° C.) | Calorific value (J/g) |
|---|---|---|---|---|---|
| Example 1-1 | 61 | 45 | 132 | 293 | 1,900 |
| Example 2-1 | 57 | 43 | 106 | 275 | 2,900 |
| Example 3-1 | 81 | 54 | 147 | 296 | 1,800 |
| Example 4-1 | 87 | 57 | 152 | 298 | 1,700 |
| Example 5-1 | 79 | 53 | 122 | 278 | 2,700 |
| Example 6-1 | 63 | 47 | 139 | 297 | 1,830 |
| Example 7-1 | 60 | 44 | 135 | 295 | 1,850 |
| Comparative Example 1-1 | — | 34 | 97 | 260 | 4,300 |
| Comparative Example 2-1 | 27 | 37 | 101 | 267 | 3,700 |

Referring to Table 1, the lithium secondary batteries of Examples 1-1 to 7-1 respectively comprising the negative electrodes of Examples 1 to 7 had a SOC when lithium precipitation occurred of 43% or more, wherein it may be confirmed that the SOCs when lithium precipitation occurred were larger than 34%, a SOC of the lithium secondary battery of Comparative Example 1-1 comprising the negative electrode of Comparative Example 1, and 37%, a SOC of the lithium secondary battery of Comparative Example 2-1 comprising the negative electrode of Comparative Example 2. That is, it may be understood that the lithium secondary batteries of Examples 1-1 to 7-1 may stably have a larger amount of charge before lithium precipitated during rapid charging than the lithium secondary batteries of Comparative Examples 1-1 and 2-1.

Also, when the lithium secondary batteries of Comparative Examples 1-1 and 2-1 were compared, it may be confirmed that lithium secondary battery of Comparative Example 2-1 had a larger state of charge when lithium precipitation occurred.

From the above results, with respect to the negative electrode in which LiF was deposited on the negative electrode active material layer comprising natural graphite, since a stable and thin SEI is allowed to be formed by the LiF layer during the activation process, it is considered that the rapid charging was improved.

However, when the lithium secondary batteries of Example 2-1 and Comparative Example 2-1 were compared, all of the negative electrodes included in these lithium secondary batteries had the 10 nm thick LiF layer formed on the negative electrode active material layer, but the state of charges when lithium precipitation occurred of the lithium secondary batteries of Example 2-1 and Comparative Example 2-1 were 43% and 37%, respectively. With respect to the negative electrodes included in the lithium secondary batteries of Example 2-1 and Comparative Example 2-1, since there was a difference only in the amount of the amorphous LiF included in the LiF layer, it may be confirmed that, in a case in which the LiF layer formed on the negative electrode active material layer included a predetermined amount or more of the amorphous LiF, excellent rapid charging characteristics may be obtained.

Furthermore, referring to the Calorimetry experiment of Table 1, the negative electrodes included in the lithium secondary batteries of Examples 1-1 to 7-1 had higher onset temperatures and higher main peak temperatures than the negative electrodes included in the lithium secondary batteries of Comparative Examples 1-1 and 2-1. From these results, it may be considered that the lithium secondary batteries of Examples 1-1 to 7-1 may be more safely maintained at high temperature. Also, the negative electrodes included in the lithium secondary batteries of Examples 1-1 to 7-1 had lower calorific values than the negative electrodes included in the lithium secondary batteries of Comparative Examples 1-1 and 2-1, wherein, from these results, it may be predicted that the lithium secondary batteries of Examples 1-1 to 7-1 may be safer when exposed to high temperature than the lithium secondary batteries of Comparative Examples 1-1 and 2-1.

The invention claimed is:

1. A negative electrode for a lithium secondary battery, the negative electrode comprising:
   a negative electrode active material layer comprising a carbon-based active material;
   a LiF layer which is formed on the negative electrode active material layer and comprises amorphous LiF in an amount of 70 mol % to 95 mol % based on a total number of moles of LiF included in the LiF layer; and
   a metal oxide layer formed between the negative electrode active material layer and the LiF layer,
   and wherein the LiF layer has a thickness of 100 nm to 1,000 nm.

2. The negative electrode for a lithium secondary battery of claim 1, wherein the LiF layer further comprises at least one selected from the group consisting of $Li_2O$, $Li_2CO_3$, and LiOH.

3. The negative electrode for a lithium secondary battery of claim 1, wherein the carbon-based active material comprises at least one selected from the group consisting of soft carbon, hard carbon, natural graphite, artificial graphite, Kish graphite, pyrolytic carbon, mesophase pitch based carbon fibers, meso-carbon microbeads, mesophase pitches, petroleum derived cokes, and coal tar pitch derived cokes.

4. The negative electrode for a lithium secondary battery of claim 1,
   wherein the metal oxide layer comprises at least one selected from the group consisting of titanium oxide, aluminum oxide, chromium trioxide, zinc oxide, copper oxide, magnesium oxide, zirconium dioxide, molybdenum trioxide, vanadium pentoxide, niobium pentoxide, iron oxide, manganese oxide, vanadium oxide, cobalt oxide, nickel oxide, and tantalum pentoxide.

5. The negative electrode for a lithium secondary battery of claim 1, further comprising a lithium compound layer formed on the LiF layer,
   wherein the lithium compound layer comprises at least one selected from the group consisting of $Li_2O$, $Li_2CO_3$, and LiOH.

6. The negative electrode for a lithium secondary battery of claim 1,
   wherein the metal oxide layer has a thickness of 1 nm to 50 nm.

7. A preparation method of the negative electrode for a lithium secondary battery of claim 1, the method comprising steps of:
   (1) forming the negative electrode active material layer comprising the carbon-based active material on a negative electrode collector;
   (2) forming the metal oxide layer on the negative electrode active material layer; and
   (3) depositing the LiF layer on the metal oxide layer,
   and wherein the LiF layer has a thickness of 100 nm to 1,000 nm.

8. The method of claim 7, wherein the forming of the metal oxide layer is performed by drop coating, chemical vapor deposition, melting coating, electrodynamic coating, electrospraying, electrospinning, or dip coating.

9. A lithium secondary battery comprising the negative electrode for a lithium secondary battery of claim 1.

10. The negative electrode for a lithium secondary battery of claim 1, wherein the LiF layer is formed on the negative electrode active material layer by sputtering, E-Beam, physical vapor deposition (PVD) comprising evaporation or thermal evaporation, or chemical vapor deposition (CVD).

11. The negative electrode for a lithium secondary battery of claim 1, wherein the LiF layer is formed on the negative electrode active material layer by physical vapor deposition (PVD) in a temperature range of 700° C. to 900° C.

* * * * *